US011337225B2

(12) United States Patent
Venugopal et al.

(10) Patent No.: US 11,337,225 B2
(45) Date of Patent: May 17, 2022

(54) BEAM RECOVERY PROCEDURE FOR FULL DUPLEX OPERATION

(71) Applicant: QUALCOMM Incorporated, San Diego, CA (US)

(72) Inventors: Kiran Venugopal, Raritan, NJ (US); Makesh Pravin John Wilson, San Diego, CA (US); Jung Ho Ryu, Fort Lee, NJ (US); Tao Luo, San Diego, CA (US); Tianyang Bai, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/727,519

(22) Filed: Dec. 26, 2019

(65) Prior Publication Data

US 2020/0214018 A1    Jul. 2, 2020

Related U.S. Application Data

(60) Provisional application No. 62/785,572, filed on Dec. 27, 2018.

(51) Int. Cl.
*H04W 16/28* (2009.01)
*H04W 72/08* (2009.01)
(Continued)

(52) U.S. Cl.
CPC ............ *H04W 72/085* (2013.01); *H04B 1/74* (2013.01); *H04L 5/1461* (2013.01); *H04W 52/325* (2013.01); *H04W 72/046* (2013.01)

(58) Field of Classification Search
CPC ............ H04W 72/085; H04W 72/046; H04W 52/325; H04W 52/48; H04W 52/42;
(Continued)

(56) References Cited

U.S. PATENT DOCUMENTS

2018/0083679 A1    3/2018 Lim et al.
2018/0337757 A1    11/2018 Noh et al.
(Continued)

FOREIGN PATENT DOCUMENTS

WO          2018129300 A1    7/2018
WO    WO-2018204255 A1 *  11/2018  ............... H04B 7/00

OTHER PUBLICATIONS

Huawei, HiSilicon: Title "Discussion on BRF for SCell", 3GPP TSG RAN WG1, R1-1809120, Meeting #94 Gothenburg, Sweden, Aug. 20-24, 2018 (Year: 2018).*
(Continued)

*Primary Examiner* — Lan-Huong Truong
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may transmit an indication to a base station to configure a control channel of a downlink beam in accordance with a full duplex failure detection control resource set (CORE-SET), wherein the full duplex failure detection CORESET is used based at least in part on the UE being associated with a full duplex communication link that includes the downlink beam and an uplink beam; and monitor a reference signal on the control channel of the downlink beam based at least in part on the full duplex failure detection CORESET in order to detect a beam failure on the downlink beam while transmitting the uplink beam, wherein monitoring the reference signal is based at least in part on a threshold that is based on one or more uplink transmission parameters. Numerous other aspects are provided.

30 Claims, 7 Drawing Sheets

(51) Int. Cl.
*H04L 5/14* (2006.01)
*H04B 1/74* (2006.01)
*H04W 72/04* (2009.01)
*H04W 52/32* (2009.01)

(58) Field of Classification Search
CPC .. H04W 52/146; H04L 5/1461; H04L 5/0048; H04L 5/14; H04L 5/0053; H04B 1/74; H04B 7/088; H04B 7/0695
See application file for complete search history.

(56) References Cited

U.S. PATENT DOCUMENTS

2019/0053288 A1* 2/2019 Zhou .................. H04W 74/006
2019/0215048 A1* 7/2019 Cirik ...................... H04B 7/088

OTHER PUBLICATIONS

International Search Report and Written Opinion—PCT/US2019/068729—ISA/EPO—dated Apr. 17, 2020.
Qualcomm Incorporated: "Enhancements on Multi-Beam Operation", 3GPP Draft, 3GPP TSG-RAN WG1 Meeting #95, R1-1813443, Enhancements on Multi-Beam Operation, 3rd Generation Partnership Project (3GPP), Mobile Competence Centre, 650, Route Des Lucioles, F-06921 Sophia-Antipolis Cedex, France, vol. Ran WG1. No. Spokane, Washington, USA, Nov. 12, 2018-Nov. 16, 2018, Nov. 11, 2018 (Nov. 11, 2018), XP051555482, 22 pages.
Qualcomm Incorporated: "NR-LTE Co-channel Coexistence Considerations" [online], 3GPP TSG RAN WG1 #88bis, R1-1705643, Apr. 7, 2017, 7 Pages, URL:http://www.3gpp.org/ftp/tsg_ran/WG1_RL1/TSGR1_88b/Docs/R1-1705643.zip.

* cited by examiner

BEAM RECOVERY PROCEDURE FOR FULL DUPLEX OPERATION

CROSS-REFERENCE TO RELATED APPLICATION

This application claims priority to Provisional Patent Application No. 62/785,572, filed on Dec. 27, 2018, entitled "BEAM RECOVERY PROCEDURE FOR FULL DUPLEX OPERATION," which is hereby expressly incorporated by reference herein.

FIELD OF THE DISCLOSURE

Aspects of the present disclosure generally relate to wireless communication, and to techniques and apparatuses for a beam recovery procedure for full duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include transmitting an indication to a base station to configure a control channel of a downlink beam in accordance with a full duplex failure detection control resource set (CORESET), wherein the full duplex failure detection CORESET is used based at least in part on the UE being associated with a full duplex communication link that includes the downlink beam and an uplink beam; and monitoring a reference signal on the control channel of the downlink beam based at least in part on the full duplex failure detection CORESET in order to detect a beam failure on the downlink beam while transmitting the uplink beam, wherein monitoring the reference signal is based at least in part on a threshold that is based at least in part on one or more uplink transmission parameters.

In some aspects, a UE for wireless communication may include memory and one or more processors operatively coupled to the memory. The memory and the one or more processors may be configured to transmit an indication to a base station to configure a control channel of a downlink beam in accordance with a full duplex failure detection CORESET, wherein the full duplex failure detection CORESET is used based at least in part on the UE being associated with a full duplex communication link that includes the downlink beam and an uplink beam; and monitor a reference signal on the control channel of the downlink beam based at least in part on the full duplex failure detection CORESET in order to detect a beam failure on the downlink beam while transmitting the uplink beam, wherein monitoring the reference signal is based at least in part on a threshold that is based at least in part on one or more uplink transmission parameters.

In some aspects, a non-transitory computer-readable medium may store one or more instructions for wireless communication. The one or more instructions, when executed by one or more processors of a UE, may cause the one or more processors to transmit an indication to a base station to configure a control channel of a downlink beam in accordance with a full duplex failure detection CORESET, wherein the full duplex failure detection CORESET is used based at least in part on the UE being associated with a full duplex communication link that includes the downlink beam and an uplink beam; and monitor a reference signal on the control channel of the downlink beam based at least in part on the full duplex failure detection CORESET in order to detect a beam failure on the downlink beam while transmitting the uplink beam, wherein monitoring the reference signal is based at least in part on a threshold that is based at least in part on one or more uplink transmission parameters.

In some aspects, an apparatus for wireless communication may include means for transmitting an indication to a base station to configure a control channel of a downlink beam in accordance with a full duplex failure detection CORESET, wherein the full duplex failure detection CORESET is used based at least in part on the apparatus being associated with a full duplex communication link that includes the downlink beam and an uplink beam; and means for monitoring a reference signal on the control channel of the downlink beam based at least in part on the full duplex failure detection CORESET in order to detect a beam failure on the downlink beam while transmitting the uplink beam, wherein monitoring the reference signal is based at least in part on a threshold that is based at least in part on one or more uplink transmission parameters.

In some aspects, a method of wireless communication, performed by a base station, may include receiving an indication to configure a control channel of a downlink beam in accordance with a full duplex failure detection CORESET, wherein the full duplex failure detection CORESET is for a UE associated with a full duplex communication link that includes the downlink beam and an uplink beam; configuring the full duplex failure detection CORESET, or a threshold associated with the full duplex failure detection CORESET, based at least in part on one or more uplink transmission parameters associated with the uplink beam; and transmitting a reference signal on the control channel of the downlink beam while the uplink beam is received based at least in part on the full duplex failure detection CORESET for beam failure detection.

In some aspects, a base station for wireless communication may include memory and one or more processors operatively coupled to the memory. The memory and the one or more processors may be configured to receive an indication to configure a control channel of a downlink beam in accordance with a full duplex failure detection CORESET, wherein the full duplex failure detection CORESET is for a UE associated with a full duplex communication link that includes the downlink beam and an uplink beam; configure the full duplex failure detection CORESET, or a threshold associated with the full duplex failure detection CORESET, based at least in part on one or more uplink transmission parameters associated with the uplink beam; and transmit a reference signal on the control channel of the downlink beam while the uplink beam is received based at least in part on the full duplex failure detection CORESET for beam failure detection.

In some aspects, a non-transitory computer-readable medium may store one or more instructions for wireless communication. The one or more instructions, when executed by one or more processors of a base station, may cause the one or more processors to receive an indication to configure a control channel of a downlink beam in accordance with a full duplex failure detection CORESET, wherein the full duplex failure detection CORESET is for a UE associated with a full duplex communication link that includes the downlink beam and an uplink beam; configure the full duplex failure detection CORESET, or a threshold associated with the full duplex failure detection CORESET, based at least in part on one or more uplink transmission parameters associated with the uplink beam; and transmit a reference signal on the control channel of the downlink beam while the uplink beam is received based at least in part on the full duplex failure detection CORESET for beam failure detection.

In some aspects, an apparatus for wireless communication may include means for receiving an indication to configure a control channel of a downlink beam in accordance with a full duplex failure detection CORESET, wherein the full duplex failure detection CORESET is for a UE associated with a full duplex communication link that includes the downlink beam and an uplink beam; means for configuring the full duplex failure detection CORESET, or a threshold associated with the full duplex failure detection CORESET, based at least in part on one or more uplink transmission parameters associated with the uplink beam; and means for transmitting a reference signal on the control channel of the downlink beam while the uplink beam is received based at least in part on the full duplex failure detection CORESET for beam failure detection.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
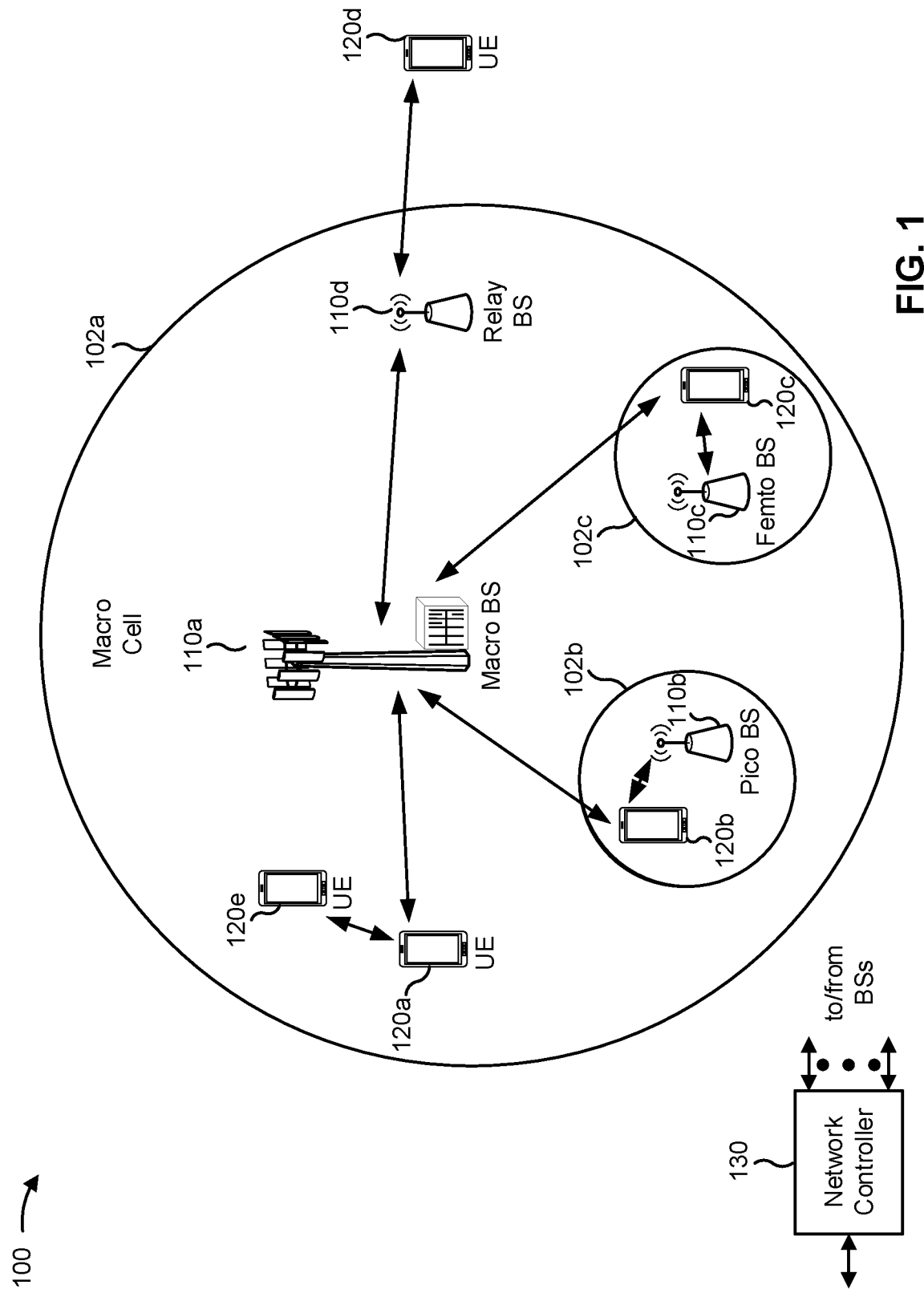
FIG. 1 is a block diagram conceptually illustrating an example of a wireless communication network, in accordance with various aspects of the present disclosure.

FIG. 1 is a block diagram conceptually illustrating a wireless communication network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
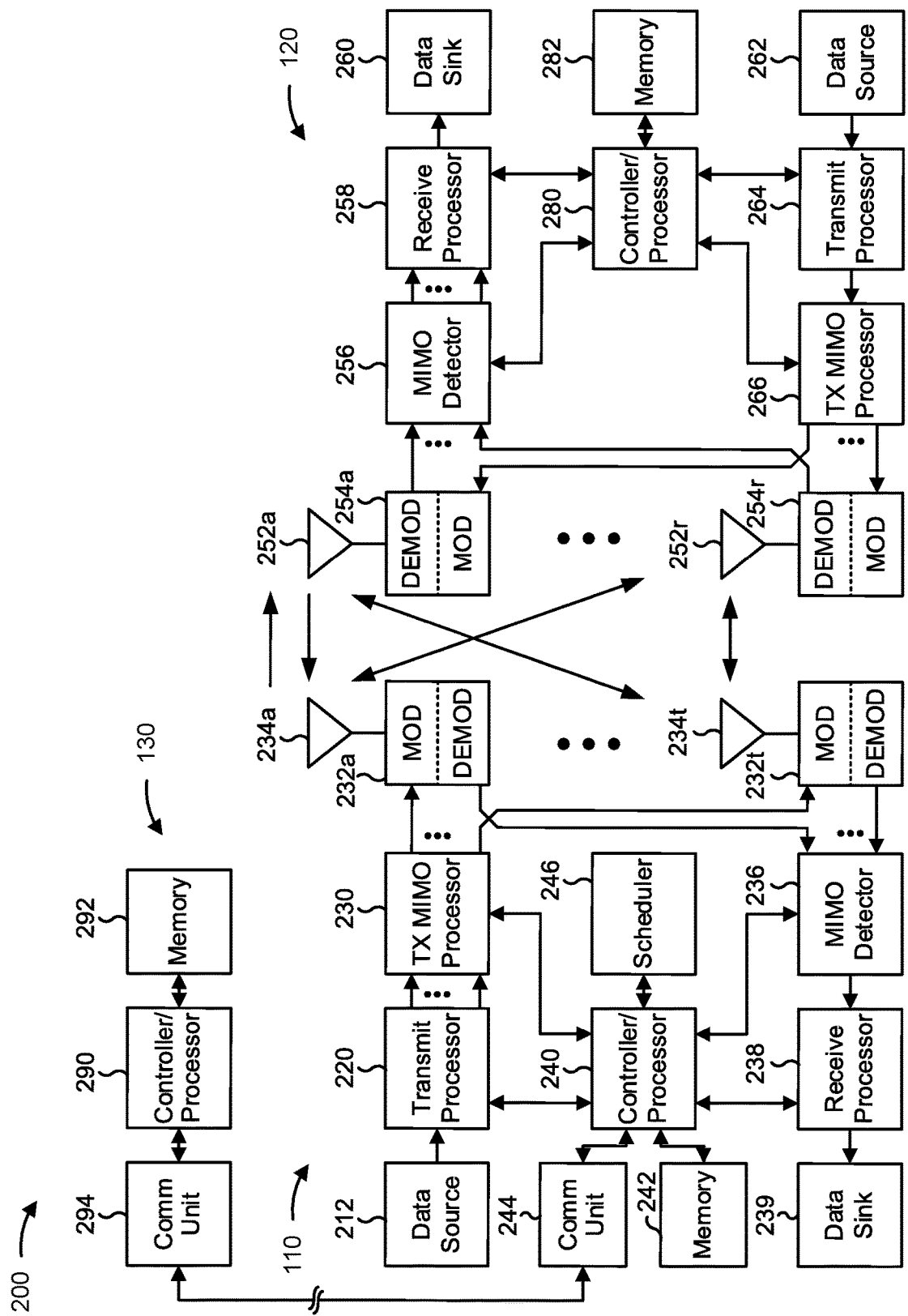
FIG. 2 is a block diagram conceptually illustrating an example of a base station in communication with a user equipment in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a beam failure recovery procedure for full duplex communication, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. Memories 242 and 282 can comprise a non-transitory computer-readable medium storing one or more instructions for wireless communication, where the one or more instructions comprise one or more instructions that, when executed by one or more processors of the UE 120 or the BS 110, cause the one or more processors to perform the methods described in greater detail with reference to FIGS. 3, 4A, 4B, 5, and 6. A scheduler 246 may schedule UEs for data transmission on the downlink and/or uplink.

In some aspects, UE 120 may include means for transmitting an indication to a base station to configure a control channel of a downlink beam in accordance with a full duplex failure detection CORESET, wherein the full duplex failure detection CORESET is used based at least in part on the UE being associated with a full duplex communication link that includes the downlink beam and an uplink beam (e.g., using controller/processor 280, transmit processor 264, TX MIMO processor 266, MOD 254, antenna 252, and/or the like); means for monitoring a reference signal on the control channel of the downlink beam based at least in part on the full duplex failure detection CORESET in order to detect a beam failure on the downlink beam while transmitting the uplink beam, wherein monitoring the reference signal is based at least in part on a threshold that is based at least in part on one or more uplink transmission parameters (e.g., using antenna 252, DEMOD 254, MIMO detector 256, receive processor 258, controller/processor 280, and/or the like); means for monitoring the reference signal on the control channel of the downlink beam while performing a communication on an uplink beam associated with the full duplex communication link (e.g., using antenna 252, DEMOD 254, MIMO detector 256, receive processor 258, controller/processor 280, and/or the like); means for monitoring the reference signal based at least in part on a threshold, wherein the threshold is based at least in part on an uplink transmission parameter (e.g., using antenna 252, DEMOD 254, MIMO detector 256, receive processor 258, controller/processor 280, and/or the like); means for detecting the beam failure based at least in part on monitoring the reference signal (e.g., using antenna 252, DEMOD 254, MIMO detector 256, receive processor 258, controller/processor 280, and/or the like); means for performing a beam failure recovery procedure based at least in part on a beam failure recovery threshold and based at least in part on detecting the beam failure (e.g., using controller/processor 280, transmit processor 264, TX MIMO processor 266, MOD 254, antenna 252, and/or the like); means for providing, on an uplink resource, an indication of the beam failure of the full duplex communication link (e.g., using controller/ processor 280, transmit processor 264, TX MIMO processor 266, MOD 254, antenna 252, and/or the like); means for receiving information identifying a recovery resource for the beam failure recovery procedure (e.g., using antenna 252, DEMOD 254, MIMO detector 256, receive processor 258, controller/processor 280, and/or the like); means for receiving information indicating that uplink transmission is to be ceased while the beam failure recovery procedure is performed; means for ceasing uplink transmission, while the beam failure recovery procedure is performed, based at least in part on receiving the information indicating that uplink transmission is to be ceased (e.g., using antenna 252, DEMOD 254, MIMO detector 256, receive processor 258, controller/processor 280, and/or the like); means for receiving information indicating to cease monitoring for the reference signal on the control channel of the downlink beam based at least in part on the full duplex failure detection CORESET (e.g., using antenna 252, DEMOD 254, MIMO detector 256, receive processor 258, controller/processor 280, and/or the like); means for ceasing monitoring for the reference signal in accordance with the information indicating to cease monitoring for the reference signal (e.g., using antenna 252, DEMOD 254, MIMO detector 256, receive processor 258, controller/processor 280, and/or the like); and/or the like. In some aspects, such means may include one or more components of UE 120 described in connection with FIG. 2.

In some aspects, base station 110 may include means for receiving an indication to configure a control channel of a downlink beam in accordance with a full duplex failure detection CORESET, wherein the full duplex failure detection CORESET is for a UE associated with a full duplex communication link that includes the downlink beam and an uplink beam (e.g., using antenna 234, DEMOD 232, MIMO detector 236, receive processor 238, controller/processor 240, and/or the like); means for configuring the full duplex failure detection CORESET, or a threshold associated with the full duplex failure detection CORESET, based at least in part on one or more uplink transmission parameters associated with the uplink beam (e.g., using controller/processor 240, transmit processor 220, TX MIMO processor 230, MOD 232, antenna 234, and/or the like); means for transmitting a reference signal on the control channel of the downlink beam while the uplink beam is received based at least in part on the full duplex failure detection CORESET for beam failure detection (e.g., using controller/processor 240, transmit processor 220, TX MIMO processor 230, MOD 232, antenna 234, and/or the like); means for transmitting the reference signal on the control channel of the downlink beam while receiving a communication on an uplink beam associated with the full duplex communication link (e.g., using controller/processor 240, transmit processor 220, TX MIMO processor 230, MOD 232, antenna 234, and/or the like); means for receiving information indicating that a beam failure has occurred on an uplink resource of the full duplex communication link (e.g., using antenna 234, DEMOD 232, MIMO detector 236, receive processor 238, controller/processor 240, and/or the like); means for transmitting information identifying a recovery resource for a beam failure recovery procedure (e.g., using controller/processor 240, transmit processor 220, TX MIMO processor 230, MOD 232, antenna 234, and/or the like); means for transmitting information indicating that uplink transmission is to be ceased while a beam failure recovery procedure is performed (e.g., using controller/processor 240, transmit processor 220, TX MIMO processor 230, MOD 232, antenna 234, and/or the like); means for transmitting information indicating to cease monitoring for the reference signal on the control channel of the downlink beam based at least in part on the full duplex failure detection CORESET (e.g., using controller/processor 240, transmit processor 220, TX MIMO processor 230, MOD 232, antenna 234, and/or the like); means for ceasing transmission of the reference signal in accordance with the information indicating to cease monitoring for the reference signal (e.g., using controller/processor 240, transmit processor 220, TX MIMO processor 230, MOD 232, antenna 234, and/or the like); and/or the like. In some aspects, such means may include one or more components of base station 110 described in connection with FIG. 2.

As indicated above, FIG. 2 is provided merely as an example. Other examples may differ from what is described with regard to FIG. 2.

A UE and a base station may communicate with each other using beams. For example, a beam may be a downlink beam (e.g., on which information may be conveyed from the base station to the UE) or an uplink beam (e.g., on which information may be conveyed from the UE to the base station). A communication link between a UE and a base station may be referred to as half duplex when the communication link includes only one of an uplink beam or a downlink beam, or full duplex when the communication link includes an uplink beam and a downlink beam. Communication links may be referred to herein as links. A full duplex link may provide increased scalability of data rates on the link in comparison to a half duplex link. In a full duplex link, different antenna elements, sub-arrays, or antenna panels of a wireless communication device may simultaneously or contemporaneously perform uplink and downlink communication.

A UE may monitor reference signals transmitted by a base station to detect beam failure. Beam failure may occur due to changing channel conditions, obstacles, distance from the base station transmitting the beam, interference, and/or the like. When a reference signal of a first set of beams fails to satisfy a threshold (e.g., a Qout threshold and/or the like) on a particular number of monitoring occasions, the UE may identify a beam failure. The UE may perform a beam recovery procedure upon detecting a beam failure, as described in detail elsewhere herein. The reference signals monitored by the UE may be transmitted on a control channel, which may be identified by a control resource set (CORESET). A particular CORESET may also be associated with configuration information for monitoring the reference signals, such as thresholds for declaring beam failure and/or identifying a candidate beam, a block error rate (BLER) associated with the thresholds, and/or the like.

Full duplex communication may present certain challenges in comparison to half duplex communication. For example, a wireless communication device (e.g., a UE or a base station) may experience self-interference between an uplink beam and a downlink beam of a full duplex link or between components of the wireless communication device. This self-interference may complicate the monitoring of reference signals to detect beam failure. Furthermore, self-interference, cross-correlation, and/or the like, may occur in a full duplex link that may not occur in a half duplex link, so a CORESET for monitoring beam failure in a half duplex link (e.g., the resource allocations, the thresholds, and/or the like) may not be suitable or ideal for monitoring beam failure in a full duplex link due to such self-interference or cross-correlation.

Some techniques and apparatuses described herein provide a full duplex failure detection CORESET for monitoring beam failure on a downlink beam of a full duplex link while transmitting on an uplink beam of the full duplex link. In some aspects, reference signals or a control channel of the full duplex failure detection CORESET may be configured to mitigate self-interference between an uplink beam of the full duplex link and the reference signals or the control channel. In some aspects, the full duplex failure detection CORESET may be associated with a configuration for monitoring the reference signals, such as thresholds for beam failure and/or candidate beam detection, and/or the like. In some aspects, such thresholds may be a function of an uplink transmission parameter, such as an uplink channel characteristic, a cross-coupling parameter, a maximum uplink transmit power, an angle of arrival of a downlink beam, an angle of departure of an uplink beam, and/or the like.

The full duplex failure detection CORESET may provide improved performance for beam failure detection and recovery in full duplex links in comparison to a half duplex failure detection CORESET. For example, the full duplex failure detection CORESET may reduce self-interference with the reference signals, may enable interference mitigation for the reference signals, and/or the like. Thus, reliability and throughput of the full duplex link may be improved by more accurate beam failure detection and quicker beam failure recovery and data transmission or reception in comparison to beam failure detection, recovery, and data transmission or reception using a half duplex failure detection CORESET.

Figure 3:
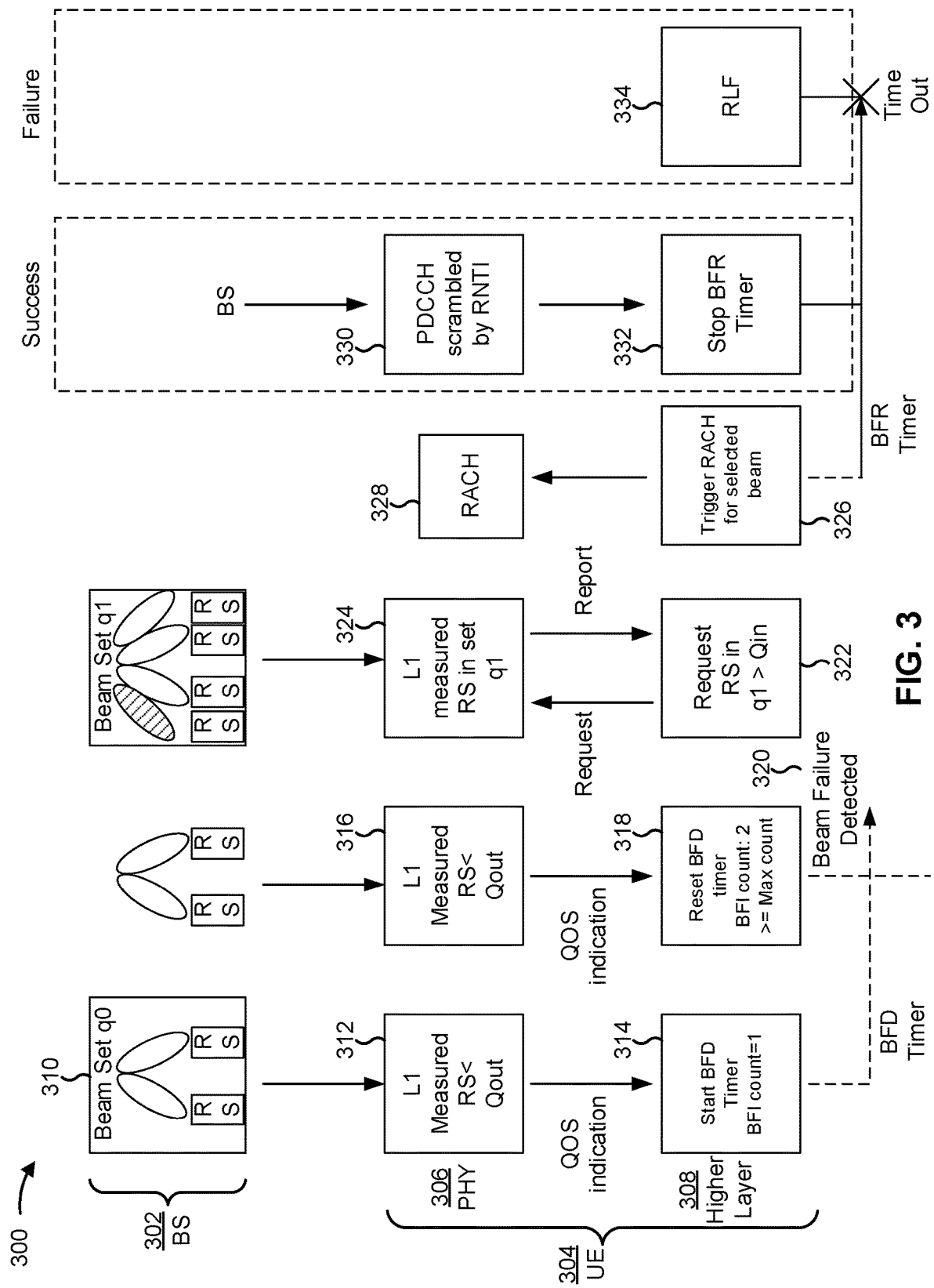
FIG. 3 is a diagram illustrating an example of beam failure detection and beam failure recovery, in accordance with various aspects of the present disclosure.

FIG. 3 is a diagram illustrating an example 300 of beam failure detection and beam failure recovery, in accordance with various aspects of the present disclosure. The beam failure detection and beam failure recovery procedures described with respect to FIG. 3 may be performed for a half duplex link (e.g., downlink only) or a full duplex link (e.g., downlink and uplink). In the case of a half duplex link, the procedures described with respect to FIG. 3 may be performed based at least in part on a half duplex failure detection CORESET. In the case of a full duplex link, the procedures described with respect to FIG. 3 may be performed based at least in part on a full duplex failure detection CORESET. The full duplex failure detection CORESET is described in more detail in connection with FIGS. 4A and 4B. The beam failure detection (BFD) procedure is shown by reference numbers 312 through 320, and the beam failure recovery (BFR) procedure is shown by reference number 322 through 334.

Example 300 includes operations performed by a base station (e.g., BS 110) and operations performed by a UE (e.g., UE 120). Operations performed by the base station are shown in the top part of FIG. 3, as shown by reference number 302. Operations performed by the UE are shown in the bottom part of FIG. 3, as shown by reference number 304. Each operation is indicated by a box, and arrows indicate a direction of an indication, a transmission, and/or the like. Actions of the UE that are performed by a physical (PHY) layer of the UE are shown in the row indicated by reference number 306, and actions of the UE that are performed by a higher layer (e.g., medium access control (MAC), radio link control (RLC), packet data convergence protocol (PDCP), radio resource control (RRC), non access stratum (NAS), Internet Protocol (IP), and/or the like) are shown in the row indicated by reference number 308.

As shown by reference number 310, the base station may transmit a beam set q0. The beam set q0 may include one or more beams that are each associated with a corresponding reference signal (RS). The reference signal may include a synchronization signal block (SSB), a channel state information (CSI) RS (CSI-RS), and/or the like. In some aspects, the base station may transmit the beam set q0 based at least in part on a failure detection CORESET, such as a half-duplex failure detection CORESET or a full duplex failure detection CORESET. For example, the base station may select the beams of the beam set q0 and/or control channels on which the respective reference signals of the beams are to be transmitted, based at least in part on the failure detection CORESET.

As shown by reference number 312, the UE may perform a Layer 1 (L1) measurement of the reference signals of the beam set q0. For example, the UE may determine a measurement regarding each reference signal of the beam set q0. The measurement may include a reference signal received power, a reference signal received quality, a signal to interference and noise ratio, and/or the like. As further shown, the UE (e.g., the PHY layer) may determine that the L1 measurement fails to satisfy a first threshold, referred to as Qout. Qout may be defined based at least in part on the level at which the downlink radio link cannot be reliably received, indicating that the UE is out of sync with the base station. In some aspects, Qout may be based at least in part on an out-of-sync block error rate ($BLER_{out}$). In some aspects, Qout may be based at least in part on an uplink channel parameter of the UE, as described in more detail elsewhere herein. As shown, the UE (e.g., the physical layer) may provide a quality of service (QoS) indication to a higher layer of the UE.

As shown by reference number 314, the UE (e.g., the higher layer) may start a beam failure detection (BFD) timer based at least in part on the failure of the beams to satisfy Qout and may increment a beam failure indication (BFI) count. If the BFI count satisfies a threshold (shown as max count in connection with reference number 318) before the expiration of the BFD timer, then the UE may determine beam failure. If the BFD timer expires before the BFI count satisfies the threshold, then the UE may reset the BFI count, thereby not determining a beam failure.

As shown by reference number 316, the UE (e.g., the PHY layer) may perform a second L1 measurement of the reference signals of the beam set q0. As further shown, the UE may provide a QoS indication to the higher layer of the UE indicating that the second L1 measurement fails to satisfy Qout. If the second L1 measurement had satisfied Qout, then the BFD timer may expire and the UE may not identify beam failure.

As shown by reference number 318, the UE may reset the BFD timer based at least in part on the second L1 measurement failing to satisfy the threshold and may increment the BFI count. As further shown, the BFI count now satisfies the maximum count threshold. Accordingly, as shown by reference number 320, the UE determines that beam failure is detected.

As shown by reference number 322, the UE (e.g., the higher layer) may request measurement of reference signals on a beam set q1 to identify one or more beams of the beam set q1 that satisfy a second threshold (e.g., Qin, sometimes referred to herein as a beam failure recovery threshold). For example, the beam set q1 may be a set of candidate beams for the beam failure recovery procedure. Qin may be defined based at least in part on a level at which the downlink radio quality can be significantly more reliably received than at Qout. In some aspects, Qin may be based at least in part on an in-sync block error rate ($BLER_{in}$). In some aspects, Qin may be based at least in part on an uplink transmission parameter, as described in more detail elsewhere herein.

As shown by reference number 324, the UE 120 (e.g., the PHY layer) may provide measurement information identifying L1 measurements of reference signals of the beam set q1. In example 300, the measurement information indicates that a particular reference signal associated with a particular beam satisfies Qin. In FIG. 3, the particular beam is illustrated by diagonal hatching. If the measurement information indicates that the particular reference signal associated with the particular beam satisfies Qin, the UE 120 may select the particular beam as a selected beam and may attempt to access the selected beam or a cell associated with the selected beam. For example, as shown by reference number 326, the UE (e.g., the higher layer) may trigger a random access channel (RACH) procedure to access the selected beam, and, as shown by reference number 328, the UE (e.g., the PHY layer) may perform the RACH procedure. For example, the UE may provide a RACH Message 1 (e.g., a first message of a RACH procedure) to the base station to access the selected beam.

In the case wherein the RACH procedure is successful, the BS may provide a physical downlink control channel (PDCCH) on the selected beam, as shown by reference number 330. In some aspects, this response may be a response to the RACH Message 1, such as a RACH Message 2, and/or the like. As further shown, the PDCCH may be scrambled using a radio network temporary identifier (RNTI) (e.g., a cell-specific RNTI or another type of RNTI). As shown by reference number 332, the UE may stop the BFR timer based at least in part on the beam failure recovery being successful.

In the case wherein the RACH procedure is unsuccessful, the UE may determine radio link failure (RLF) after expiration of the BFR timer, as shown by reference number 334. In such a case, the UE may enter an idle mode, may report the radio link failure, may search for a new cell, and/or the like.

As indicated above, FIG. 3 is provided as an example. Other examples may differ from what is described with respect to FIG. 3.

Figure 4A:
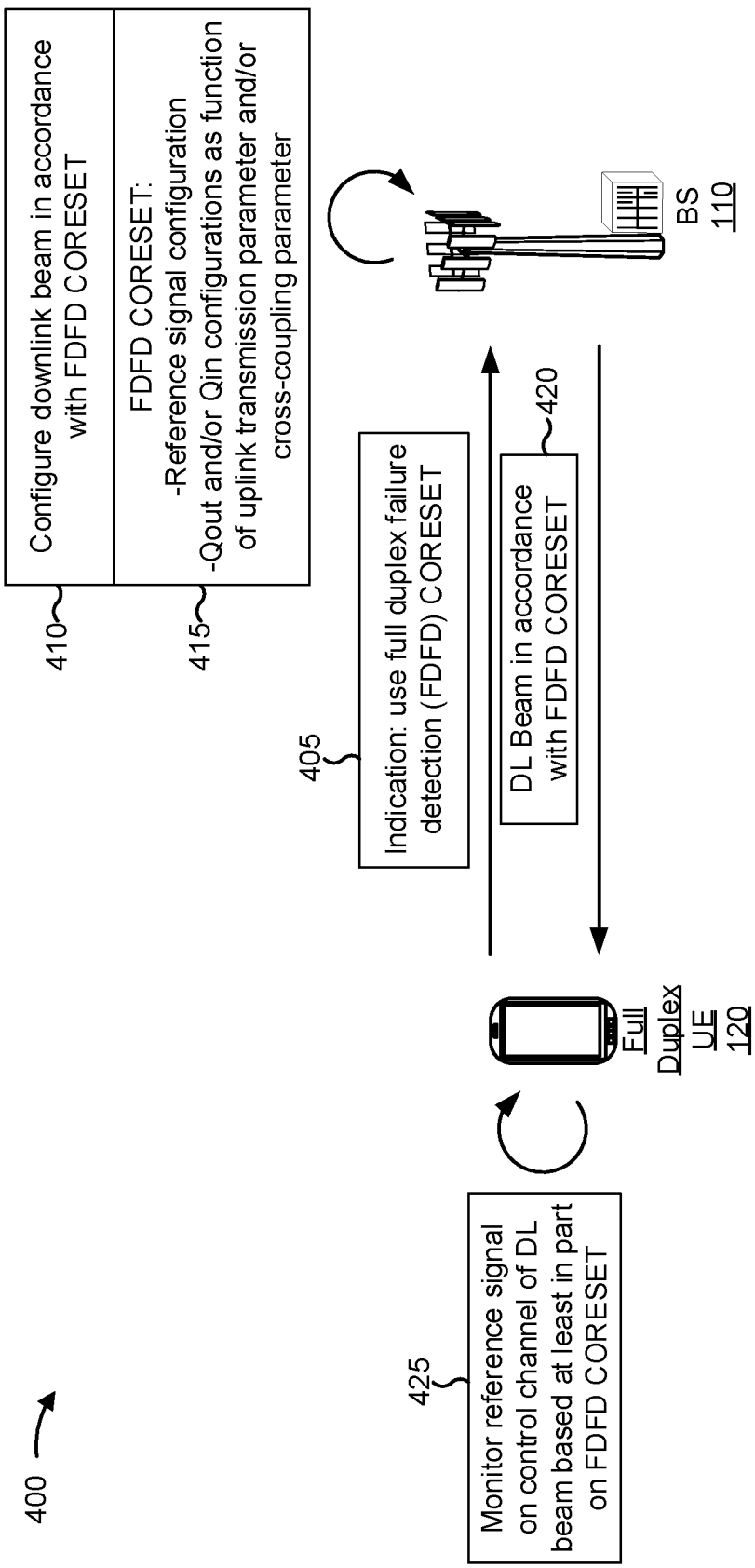
FIGS. 4A and 4B are diagrams illustrating examples of beam failure detection and recovery for a full duplex system, in accordance with various aspects of the present disclosure.
Figure 4B:
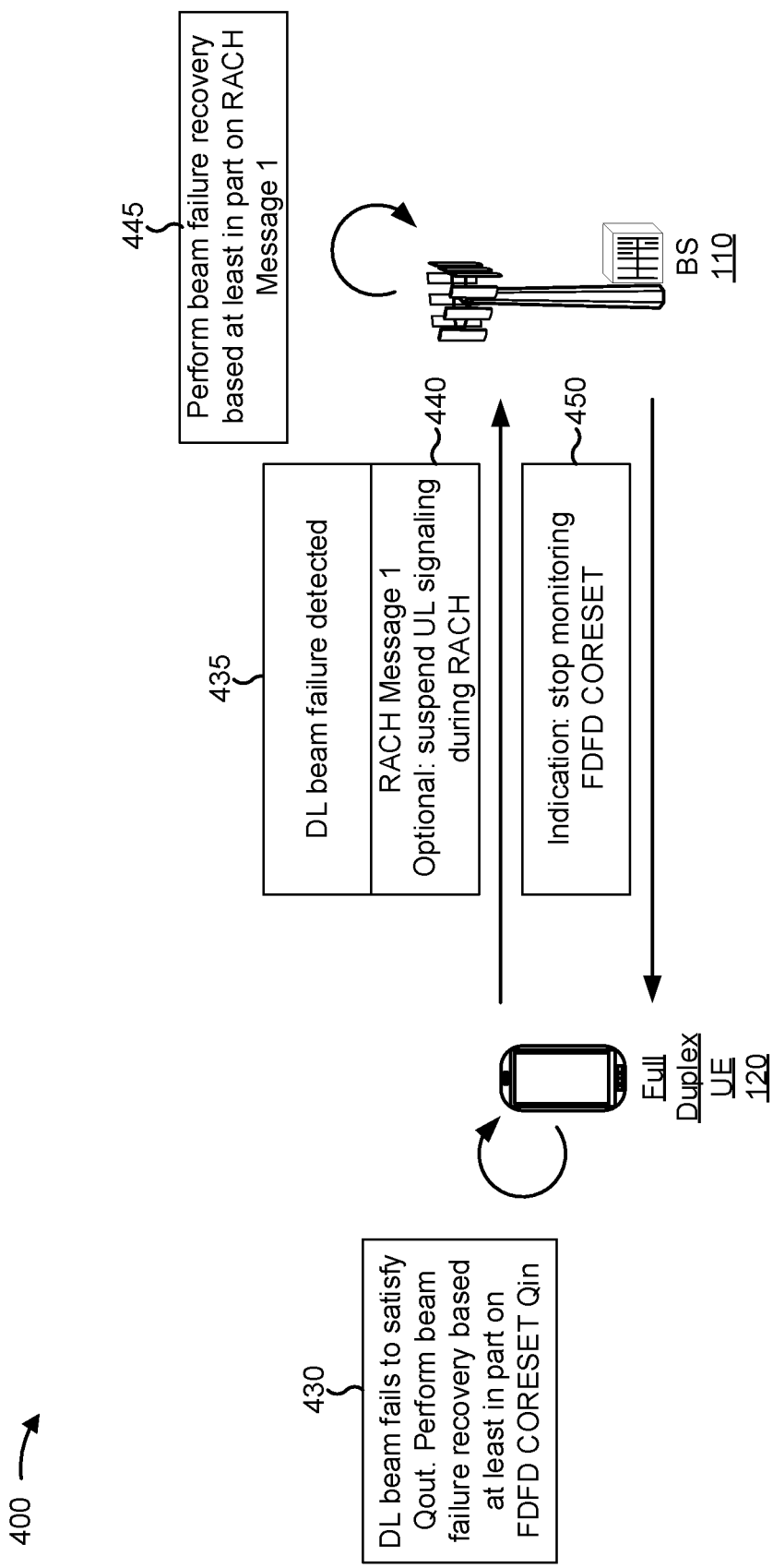

FIGS. 4A and 4B are diagrams illustrating examples 400 of beam failure detection and recovery for a full duplex system, in accordance with various aspects of the present disclosure. As shown, FIGS. 4A and 4B include a UE 120 and a BS 110. As further shown, the UE 120 may be configured for full duplex communication with the BS 110. For example, a communication link between the UE 120 and the BS 110 may be a full duplex link. In some cases, "full duplex failure detection" is abbreviated as "FDFD".

As shown in FIG. 4A, and by reference number 405, the UE 120 may provide an indication to use an FDFD CORESET for a downlink beam. The FDFD CORESET may be configured to improve performance of beam failure detection and recovery on the downlink, as described in more detail below. In some aspects, the UE 120 may provide the indication to use the FDFD CORESET based at least in part on establishing a full duplex link with the BS 110. In some aspects, the BS 110 may determine that the FDFD CORESET is to be used without receiving an indication from the UE 120. For example, the BS 110 may determine that the FDFD CORESET is to be used based at least in part on establishing the full duplex link with the UE 120. In some aspects, the UE 120 may provide the indication to use the FDFD CORESET based at least in part on a channel condition at the UE 120, based at least in part on detecting self-interference with regard to a reference signal of a downlink beam, and/or the like. Thus, the UE 120 may request that the FDFD CORESET be used based at least in part on self-interference on the full duplex link, which allows for mitigation of the self-interference in the beam failure detection and recovery procedure, thereby improving throughput and reliability of the full duplex link.

In some aspects, the indication may indicate that the BS 110 is to use the FDFD CORESET while uplink data is transmitted by the UE 120. For example, the BS 110 may use the FDFD CORESET when the UE 120 is performing full duplex communication and may use a half duplex failure detection CORESET when the UE 120 is performing half duplex communication (e.g., downlink only). Thus, the BS 110 may selectively use a CORESET suited to a communication state of the UE 120, thereby improving efficiency of failure detection and, therefore, reliability and throughput of the communication link between the BS 110 and the UE 120.

As shown by reference number 410, the BS 110 may configure a downlink (DL) beam in accordance with the FDFD CORESET. For example, the BS 110 may map a reference signal (e.g., an SSB, a CSI-RS, and/or the like) to a control channel identified by the FDFD CORESET. As another example, the BS 110 may use particular beams to transmit the reference signal. For example, the BS 110 may select the control resource and/or the particular beams based at least in part on the FDFD CORESET.

As shown by reference number 415, in some aspects, the FDFD CORESET may identify a reference signal configuration (e.g., which reference signal is to be transmitted, which control channel is to be used for a reference signal, a periodicity of the reference signal, and/or the like). In some aspects, the FDFD CORESET may identify a configuration for Qin and/or Qout. For example, the configuration for Qin and/or Qout may be a function of an uplink transmission parameter. Examples of uplink transmission parameters may include information regarding an uplink channel for an uplink beam of the full duplex link (e.g., a channel condition, a set of uplink channels that are possible, a transmission power parameter, and/or the like), information identifying a cross-coupling parameter (e.g., information identifying an expected amount of interference between the uplink channel and a reference signal), information identifying a maximum uplink transmit power, information identifying an angle of arrival of a downlink beam, information identifying an angle of departure of an uplink beam, and/or the like. In some aspects, the uplink transmission parameters may be identified in a table, a sub-table, and/or the like.

By determining Qin and/or Qout based at least in part on the uplink transmission parameter, identification of beam failure and/or beam recovery candidates may be improved. For example, a Qin or Qout value that is based only on a hypothetical BLER may not be suitable when self-interference on the full duplex link is expected, since the hypothetical BLER may be based at least in part on an assumption that no self-interference is present. As a more particular example, if self-interference is present, a reference signal received power of the reference signal may be inflated by the interference, thereby causing a beam that has failed to be measured as viable. By taking into account uplink transmission parameters for identification of beam failure, the UE 120 may improve the accuracy of beam failure identification during full duplex communication.

As shown by reference number 420, the BS 110 may transmit the downlink beam in accordance with the FDFD CORESET. For example, the BS 110 may transmit the beam set q0, described in connection with FIG. 3, based at least in part on the FDFD CORESET. As shown by reference number 425, the UE 120 may monitor a reference signal on a control channel of the downlink beam based at least in part on the FDFD CORESET. For example, the UE 120 may monitor particular resources, particular beams, and/or the like, based at least in part on the FDFD CORESET. As another example, the UE 120 may identify beam failure based at least in part on a Qout threshold that is at least partially a function of an uplink transmission parameter.

As shown in FIG. 4B, and by reference number 430, the UE 120 may determine that the downlink beam fails to satisfy Qout. For example, the UE 120 may determine that each beam of q0 fails to satisfy Qout, as defined by the FDFD CORESET. Therefore, the UE 120 may perform a beam failure recovery procedure based at least in part on a value of Qin that is determined based at least in part on the FDFD CORESET. For example, the UE 120 may measure reference signals of a beam set q1 (e.g., beam set q1 of FIG. 3) and may identify a selected beam that is associated with a measurement that satisfies Qin (not shown in FIG. 4B). In some aspects, the UE 120 may be configured with information identifying resources to monitor for the reference signals of the beam set q1. For example, the information identifying the resources to monitor may be part of the FDFD CORESET, may be configured using radio resource control (RRC) messaging, and/or the like.

As shown by reference number 435, in some aspects, the UE 120 may provide an indication that beam failure is detected. For example, the UE 120 may provide the indication that beam failure is detected using an uplink resource of the full duplex link. The BS 110 may perform the beam failure recovery procedure based at least in part on the indication that beam failure is detected. For example, the BS 110 may provide the beam set q1, may select beams for the beam set q1, may increase a transmit power for the UE 120, and/or the like.

As shown by reference number 440, the UE 120 may perform a RACH procedure to access a selected beam, as described in more detail in connection with FIG. 3. For example, the UE 120 may transmit a RACH Message 1 on a resource corresponding to a selected beam of a set of candidate beams. In some aspects, as shown, the UE 120 may suspend or cease uplink communication during the RACH procedure. For example, the UE 120 may be configured to suspend uplink signaling during the RACH procedure (e.g., as part of the FDFD CORESET or separately from the FDFD CORESET), may receive an indication that uplink signaling is to be suspended during the RACH procedure, and/or the like. Thus, interference between the RACH procedure and the uplink signaling is reduced, thereby improving reliability of the RACH procedure.

As shown by reference number 445, the BS 110 may perform the beam failure recovery procedure based at least in part on the RACH Message 1. For example, if the UE 120 is to access the selected beam, the BS 110 may provide a response to the RACH Message 1 that includes a PDCCH for the selected beam and/or the like. This is described in more detail in connection with FIG. 3, above.

As shown by reference number 450, the BS 110 may provide an indication, to the UE 120, to stop monitoring the FDFD CORESET. In such a case, the UE 120 may stop monitoring the FDFD CORESET in accordance with the indication. The BS 110 may provide such an indication based at least in part on ending the full duplex link, based at least in part on no uplink communication with the UE 120 being scheduled, based at least in part on channel conditions at the UE 120 or the BS 110, and/or the like. In some aspects, after receiving the indication to stop monitoring the FDFD CORESET, the UE 120 may monitor for downlink beam failure using a half duplex failure detection CORESET. Thus, the BS 110 may cause the UE 120 to selectively use the FDFD CORESET or the half duplex FD CORESET, which may improve efficiency of beam failure detection and recovery, thereby improving throughput of the communication link between the BS 110 and the UE 120.

As indicated above, FIGS. 4A and 4B are provided as examples. Other examples may differ from what is described with respect to FIGS. 4A and 4B.

Figure 5:
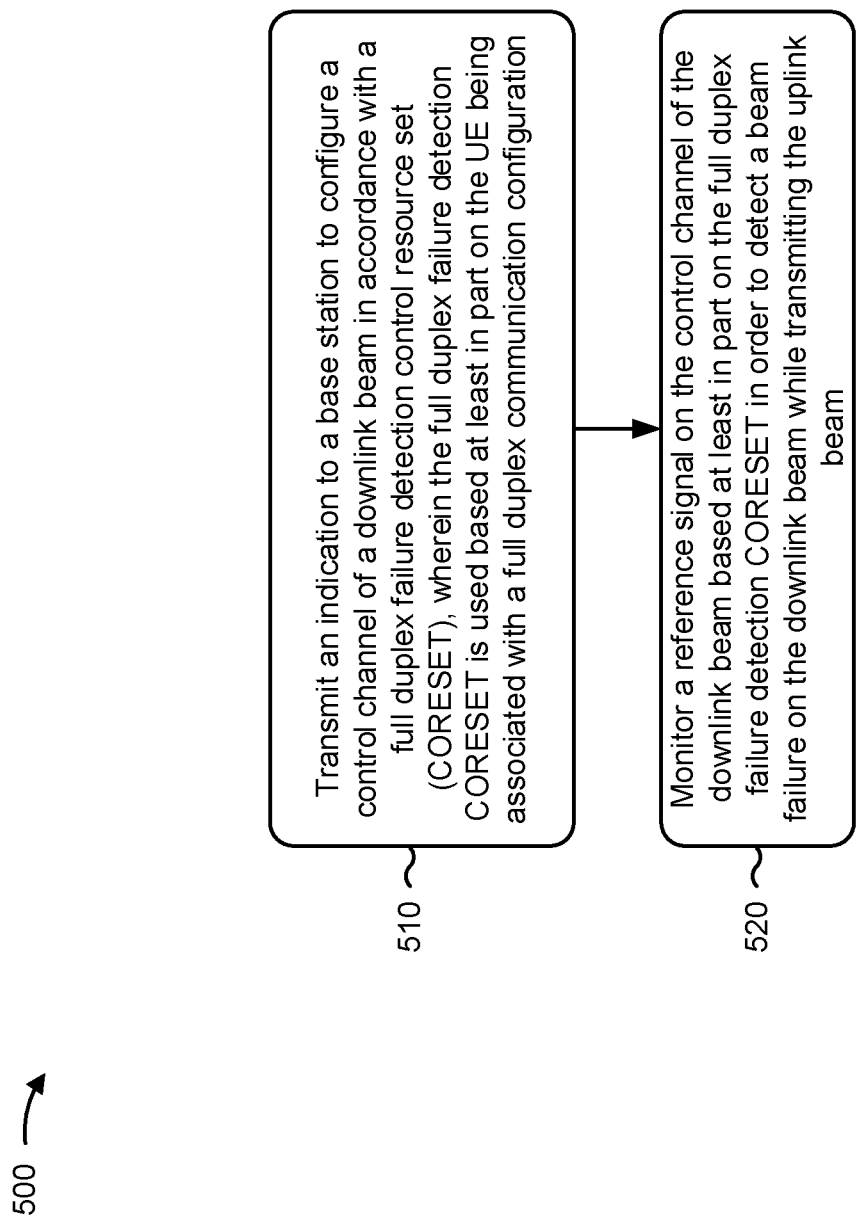
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs beam failure detection and recovery for a full duplex system.

As shown in FIG. 5, in some aspects, process 500 may include transmitting an indication to a base station to configure a control channel of a downlink beam in accordance with a full duplex failure detection CORESET, wherein the full duplex failure detection CORESET is used based at least in part on the UE being associated with a full duplex communication link (block 510). For example, the UE (e.g., using controller/processor 280, transmit processor 264, TX MIMO processor 266, MOD 254, antenna 252, and/or the like) may transmit an indication to a base station, as described above, for example, with reference to FIGS. 3, 4A, and 4B. The indication may indicate that the base station is to configure a control channel of a downlink beam in accordance with a full duplex failure detection CORESET, which is sometimes referred to herein as an FDFD CORESET. The full duplex failure detection CORESET may be used based at least in part on the UE being associated with a full duplex communication link. The full duplex communication link may include the downlink beam and an uplink beam.

As shown in FIG. 5, in some aspects, process 500 may include monitoring a reference signal on the control channel of the downlink beam based at least in part on the full duplex failure detection CORESET in order to detect a beam failure on the downlink beam while transmitting the uplink beam (block 520). For example, the UE (e.g., using antenna 252, DEMOD 254, MIMO detector 256, receive processor 258, controller/processor 280, and/or the like) may monitor a reference signal on the control channel of the downlink beam, as described above, for example, with reference to FIGS. 3, 4A, and 4B. The UE may monitor the reference signal based at least in part on the full duplex failure detection CORESET. The UE may monitor the reference signal in order to detect a beam failure on the downlink beam while transmitting the uplink beam. The UE may monitor the reference signal based at least in part on a threshold that is based at least in part on one or more uplink transmission parameters.

Process 500 may include additional aspects, such as any single aspect and/or any combination of aspects described below and/or in connection with one or more other processes described elsewhere herein.

In a first aspect, the UE may monitor the reference signal on the control channel of the downlink beam while performing a communication on an uplink beam associated with the full duplex communication link. In a second aspect, alone or in combination with the first aspect, the UE may monitor the reference signal based at least in part on a threshold, wherein the threshold is based at least in part on an uplink transmission parameter.

In a third aspect, alone or in combination with one or more of the first and second aspects, the one or more uplink transmission parameters comprise information regarding an uplink channel for the uplink beam. In a fourth aspect, alone or in combination with one or more of the first through third aspects, the one or more uplink transmission parameters comprise information regarding a cross-coupling value between the uplink beam and the downlink beam.

In a fifth aspect, alone or in combination with one or more of the first through fourth aspects, the one or more uplink transmission parameters comprise information identifying a transmit power restriction for the uplink beam while the monitoring is performed.

In a sixth aspect, alone or in combination with one or more of the first through fifth aspects, the one or more uplink transmission parameters comprise information identifying an angle of arrival or an angle of departure of the full duplex communication link while the monitoring is performed.

In a seventh aspect, alone or in combination with one or more of the first through sixth aspects, the UE may detect the beam failure based at least in part on monitoring the reference signal; and perform a beam failure recovery procedure based at least in part on a beam failure recovery threshold and based at least in part on detecting the beam failure. In an eighth aspect, alone or in combination with one or more of the first through seventh aspects, the beam failure recovery threshold is based at least in part on the one or more uplink transmission parameters. In a ninth aspect, alone or in combination with one or more of the first through eighth aspects, the UE may provide, on an uplink resource, an indication of the beam failure of the full duplex communication link. In a tenth aspect, alone or in combination with one or more of the first through ninth aspects, the UE may receive information identifying a recovery resource for the beam failure recovery procedure. In an eleventh aspect, alone or in combination with one or more of the first through tenth aspects, the UE may receive information indicating that uplink transmission is to be ceased while the beam failure recovery procedure is performed; and cease uplink transmission, while the beam failure recovery procedure is performed, based at least in part on receiving the information indicating that uplink transmission is to be ceased. In a twelfth aspect, alone or in combination with one or more of the first through eleventh aspects, the UE may receive information indicating to cease monitoring for the reference signal on the control channel of the downlink beam based at least in part on the full duplex failure detection CORESET; and cease monitoring for the reference signal in accordance with the information indicating to cease monitoring for the reference signal.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
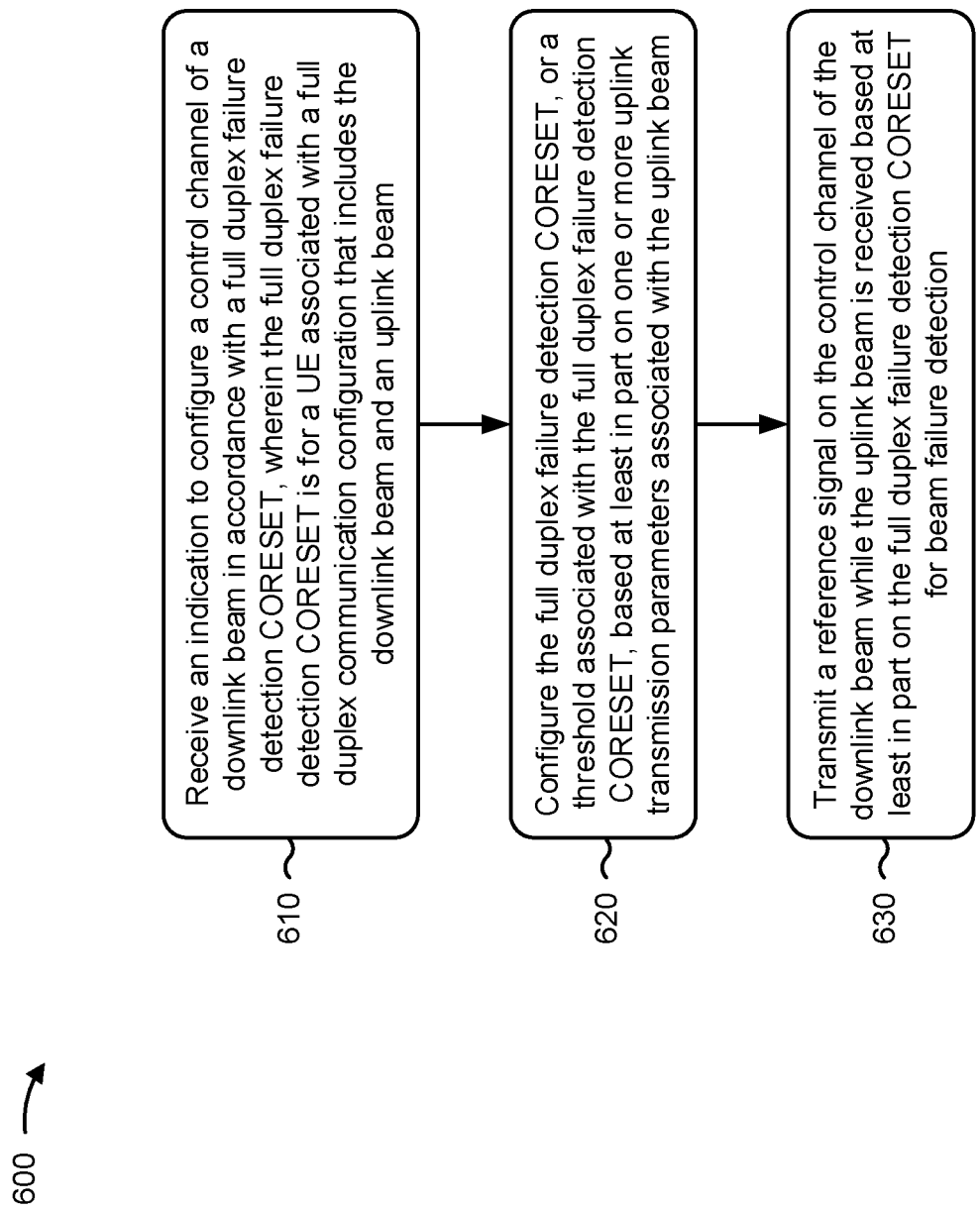
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., BS 110) performs beam failure detection and recovery for a full duplex system.

As shown in FIG. 6, in some aspects, process 600 may include receiving an indication to configure a control channel of a downlink beam in accordance with a full duplex failure detection CORESET, wherein the full duplex failure detection CORESET is for a UE associated with a full duplex communication link that includes the downlink beam and an uplink beam (block 610). For example, the base station (e.g., using antenna 234, DEMOD 232, MIMO detector 236, receive processor 238, controller/processor 240, and/or the like) may receive an indication to configure a control channel of a downlink beam in accordance with a full duplex failure detection CORESET, as described above, for example, with reference to FIGS. 3, 4A, and 4B. The full duplex failure detection CORESET may be for a UE associated with a full duplex communication link that includes the downlink beam and an uplink beam.

As shown in FIG. 6, in some aspects, process 600 may include configuring the full duplex failure detection CORESET, or a threshold associated with the full duplex failure detection CORESET, based at least in part on one or more uplink transmission parameters associated with the uplink beam (block 620). For example, the base station (e.g., using controller/processor 240, transmit processor 220, TX MIMO processor 230, MOD 232, antenna 234, and/or the like) may configure the full duplex failure detection CORESET, or may configure a threshold (e.g., Qin, Qout, or another threshold described herein) associated with the full duplex failure detection CORESET, based at least in part on one or more uplink transmission parameters associated with the uplink beam, as described above, for example, with reference to FIGS. 3, 4A, and 4B.

As shown in FIG. 6, in some aspects, process 600 may include transmitting a reference signal on the control channel of the downlink beam while the uplink beam is received, based at least in part on the full duplex failure detection CORESET for beam failure detection (block 630). For example, the base station (e.g., using controller/processor 240, transmit processor 220, TX MIMO processor 230, MOD 232, antenna 234, and/or the like) may transmit a reference signal on the control channel of the downlink beam, as described above, for example, with reference to FIGS. 3, 4A, and 4B. The base station may transmit the reference signal on the control channel based at least in part on the full duplex failure detection CORESET. The base station may transmit the reference signal on the control channel for beam failure detection (e.g., for a beam failure detection and/or recovery procedure of the UE and/or the base station). The base station may transmit the reference signal while the uplink beam is received.

Process 600 may include additional aspects, such as any single aspect and/or any combination of aspects described below and/or in connection with one or more other processes described elsewhere herein.

In a first aspect, the base station may transmit the reference signal on the control channel of the downlink beam while receiving a communication on an uplink beam associated with the full duplex communication link. In a second aspect, alone or in combination with the first aspect, the base station may receive information indicating that a beam failure has occurred on an uplink resource of the full duplex communication link. In a third aspect, alone or in combination with one or more of the first and second aspects, the base station may transmit information identifying a recovery resource for a beam failure recovery procedure.

In a fourth aspect, alone or in combination with one or more of the first through third aspects, the base station may transmit information indicating that uplink transmission is to be ceased while a beam failure recovery procedure is performed. In a fifth aspect, alone or in combination with one or more of the first through fourth aspects, the base station may transmit information indicating to cease monitoring for the reference signal on the control channel of the downlink beam based at least in part on the full duplex failure detection CORESET; and cease transmission of the reference signal in accordance with the information indicating to cease monitoring for the reference signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting an indication to a base station to configure a control channel of a downlink beam in accordance with a full duplex failure detection control resource set (CORESET),
        wherein the full duplex failure detection CORESET is used based at least in part on the UE being associated with a full duplex communication link that includes the downlink beam and an uplink beam; and
    monitoring a reference signal on the control channel of the downlink beam based at least in part on the full duplex failure detection CORESET in order to detect a beam failure on the downlink beam while the UE is transmitting data on the uplink beam,
        wherein monitoring the reference signal is based at least in part on a threshold that is based at least in part on one or more uplink transmission parameters.

2. The method of claim 1, wherein the one or more uplink transmission parameters comprise information regarding an uplink channel for the uplink beam.

3. The method of claim 1, wherein the one or more uplink transmission parameters comprise information regarding a cross-coupling value between the uplink beam and the downlink beam.

4. The method of claim 1, wherein the one or more uplink transmission parameters comprise information identifying a transmit power restriction for the uplink beam while the monitoring is performed.

5. The method of claim 1, wherein the one or more uplink transmission parameters comprise information identifying an angle of arrival or an angle of departure of the full duplex communication link while the monitoring is performed.

6. The method of claim 1, further comprising:
detecting the beam failure based at least in part on monitoring the reference signal; and
performing a beam failure recovery procedure based at least in part on a beam failure recovery threshold and based at least in part on detecting the beam failure.

7. The method of claim 6, wherein the beam failure recovery threshold is based at least in part on the one or more uplink transmission parameters.

8. The method of claim 6, further comprising:
providing, on an uplink resource, an indication of the beam failure of the full duplex communication link.

9. The method of claim 6, further comprising:
receiving information identifying a recovery resource for the beam failure recovery procedure.

10. The method of claim 6, further comprising:
receiving information indicating that uplink transmission is to be ceased while the beam failure recovery procedure is performed; and
ceasing uplink transmission, while the beam failure recovery procedure is performed, based at least in part on receiving the information indicating that uplink transmission is to be ceased.

11. The method of claim 1, further comprising:
receiving information indicating to cease monitoring for the reference signal on the control channel of the downlink beam based at least in part on the full duplex failure detection CORESET; and
ceasing monitoring for the reference signal in accordance with the information indicating to cease monitoring for the reference signal.

12. A method of wireless communication performed by a base station, comprising:
receiving an indication to configure a control channel of a downlink beam in accordance with a full duplex failure detection control resource set (CORESET),
wherein the full duplex failure detection CORESET is for a user equipment (UE) associated with a full duplex communication link that includes the downlink beam and an uplink beam;
configuring the full duplex failure detection CORESET, or a threshold associated with the full duplex failure detection CORESET, based at least in part on one or more uplink transmission parameters associated with the uplink beam; and
transmitting a reference signal on the control channel of the downlink beam while the base station receives data on the uplink beam is received based at least in part on the full duplex failure detection CORESET for beam failure detection.

13. The method of claim 12, further comprising:
receiving information indicating that a beam failure has occurred on an uplink resource of the full duplex communication link.

14. The method of claim 12, further comprising:
transmitting information identifying a recovery resource for a beam failure recovery procedure.

15. The method of claim 12, further comprising:
transmitting information indicating that uplink transmission is to be ceased while a beam failure recovery procedure is performed.

16. The method of claim 12, further comprising:
transmitting information indicating to cease monitoring for the reference signal on the control channel of the downlink beam based at least in part on the full duplex failure detection CORESET; and
ceasing transmission of the reference signal in accordance with the information indicating to cease monitoring for the reference signal.

17. A user equipment (UE) for wireless communication, comprising:
a memory; and
one or more processors operatively coupled to the memory, the memory and the one or more processors configured to:
transmit an indication to a base station to configure a control channel of a downlink beam in accordance with a full duplex failure detection control resource set (CORESET),
wherein the full duplex failure detection CORESET is used based at least in part on the UE being associated with a full duplex communication link that includes the downlink beam and an uplink beam; and
monitor a reference signal on the control channel of the downlink beam based at least in part on the full duplex failure detection CORESET in order to detect a beam failure on the downlink beam while the UE is transmitting data on the uplink beam, wherein monitoring the reference signal is based at least in part on a threshold that is based at least in part on one or more uplink transmission parameters.

18. The UE of claim 17, wherein the one or more uplink transmission parameters comprise information regarding an uplink channel for the uplink beam.

19. The UE of claim 17, wherein the one or more uplink transmission parameters comprise information regarding a cross-coupling value between the uplink beam and the downlink beam.

20. The UE of claim 17, wherein the one or more uplink transmission parameters comprise information identifying a transmit power restriction for the uplink beam while the monitoring is performed.

21. The UE of claim 17, wherein the one or more uplink transmission parameters comprise information identifying an angle of arrival or an angle of departure of the full duplex communication link while the monitoring is performed.

22. The UE of claim 17, wherein the one or more processors are further configured to:
detect the beam failure based at least in part on monitoring the reference signal; and
perform a beam failure recovery procedure based at least in part on a beam failure recovery threshold and based at least in part on detecting the beam failure.

23. The UE of claim 22, wherein the beam failure recovery threshold is based at least in part on the one or more uplink transmission parameters.

24. The UE of claim 22, wherein the one or more processors are further configured to:
provide, on an uplink resource, an indication of the beam failure of the full duplex communication link.

25. The UE of claim 22, wherein the one or more processors are further configured to:
receive information identifying a recovery resource for the beam failure recovery procedure.

26. The UE of claim 22, wherein the one or more processors are further configured to:
  receive information indicating that uplink transmission is to be ceased while the beam failure recovery procedure is performed; and
  cease uplink transmission, while the beam failure recovery procedure is performed, based at least in part on receiving the information indicating that uplink transmission is to be ceased.

27. The UE of claim 17, wherein the one or more processors are further configured to:
  receive information indicating to cease monitoring for the reference signal on the control channel of the downlink beam based at least in part on the full duplex failure detection CORESET; and
  cease monitoring for the reference signal in accordance with the information indicating to cease monitoring for the reference signal.

28. A base station for wireless communication, comprising:
  a memory; and
  one or more processors operatively coupled to the memory, the memory and the one or more processors configured to:
    receive an indication to configure a control channel of a downlink beam in accordance with a full duplex failure detection control resource set (CORESET), wherein the full duplex failure detection CORESET is for a user equipment (UE) associated with a full duplex communication link that includes the downlink beam and an uplink beam;
    configure the full duplex failure detection CORESET, or a threshold associated with the full duplex failure detection CORESET, based at least in part on one or more uplink transmission parameters associated with the uplink beam; and
    transmit a reference signal on the control channel of the downlink beam while the base station receives data on the uplink beam is received based at least in part on the full duplex failure detection CORESET for beam failure detection.

29. The base station of claim 28, wherein the one or more processors are further configured to:
  receive information indicating that a beam failure has occurred on an uplink resource of the full duplex communication link.

30. The base station of claim 28, wherein the one or more processors are further configured to:
  transmit information identifying a recovery resource for a beam failure recovery procedure.

* * * * *